United States Patent
Lamichhane et al.

(10) Patent No.: US 11,354,809 B2
(45) Date of Patent: Jun. 7, 2022

(54) DEVICE, SYSTEM AND METHOD FOR DETECTING BODY MOVEMENT OF A PATIENT

(71) Applicant: KONINKLIJKE PHILIPS N.V., Eindhoven (NL)

(72) Inventors: Bishal Lamichhane, Eindhoven (NL); Shakith Devinda Fernando, Eindhoven (NL); Adrienne Heinrich, Metro Manila (PH); Esther Marjan Van der Heide, 'S-Hertogenbosch (NL); Thomas Maria Falck, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 38 days.

(21) Appl. No.: 16/768,911

(22) PCT Filed: Nov. 28, 2018

(86) PCT No.: PCT/EP2018/082767
§ 371 (c)(1),
(2) Date: Jun. 2, 2020

(87) PCT Pub. No.: WO2019/110382
PCT Pub. Date: Jun. 13, 2019

(65) Prior Publication Data
US 2020/0342608 A1 Oct. 29, 2020

(30) Foreign Application Priority Data
Dec. 6, 2017 (EP) .................................... 17205627

(51) Int. Cl.
*G06T 7/20* (2017.01)
*G06T 7/50* (2017.01)
*G06T 7/00* (2017.01)

(52) U.S. Cl.
CPC .............. *G06T 7/20* (2013.01); *G06T 7/0012* (2013.01); *G06T 7/50* (2017.01); *G06T 2200/24* (2013.01);
(Continued)

(58) Field of Classification Search
CPC ........... G06T 7/20; G06T 7/50; G06T 7/0012; G06T 2200/24; G06T 2207/10028;
(Continued)

(56) References Cited

U.S. PATENT DOCUMENTS

| | | |
|---|---|---|
| 7,366,325 B2 | 4/2008 | Fujimura |
| 7,590,262 B2 | 9/2009 | Fujimura |

(Continued)

FOREIGN PATENT DOCUMENTS

WO  2011054971 A2  5/2011

OTHER PUBLICATIONS

J.K. Aggarwal and Q. Cai: "Human Motion Analysis:: A Review", Computer Vision an Image Understanding, vol. 73, pp. 428-440, 1999.

(Continued)

*Primary Examiner* — Siamak Harandi (57) ABSTRACT

The present invention relates to a device for detecting motion of a person. The present invention further relates to a system incorporating the aforementioned device and a corresponding method. The proposed device comprises a projection sweep unit configured to obtain image data comprising depth information corresponding to an image showing the patient and to generate one or more projection images of the patient for different viewpoints, a motion detection unit configured to detect motion of the patient in the one or more projection images and to generate one or more motion detection signals indicating if motion is detected or not in a respective projection image, and an (Continued)

analysis unit configured to detect and localize body movements of one or more body parts of the patient based on one or more combinations of motion detection signals.

15 Claims, 7 Drawing Sheets

(52) U.S. Cl.
CPC .............. *G06T 2207/10028* (2013.01); *G06T 2207/20081* (2013.01); *G06T 2207/30004* (2013.01); *G06T 2207/30196* (2013.01)

(58) Field of Classification Search
CPC . G06T 2207/20081; G06T 2207/30004; G06T 2207/30196; G06T 7/254
See application file for complete search history.

(56) References Cited

U.S. PATENT DOCUMENTS

| | | | |
|---|---|---|---|
| 8,285,045 B2 | 10/2012 | Kim | |
| 8,374,423 B2 | 2/2013 | Lee | |
| 8,401,225 B2 | 3/2013 | Newcombe | |
| 8,588,517 B2 | 11/2013 | Lee | |
| 8,787,663 B2 | 7/2014 | Litvak | |
| 8,885,890 B2 | 11/2014 | Tardif | |
| 9,098,110 B2 | 8/2015 | Eichorn | |
| 9,232,912 B2 | 1/2016 | McQueen | |
| 10,201,717 B2 | 2/2019 | Berlinger | |
| 2013/0289449 A1 | 10/2013 | Stone | |
| 2016/0147959 A1* | 5/2016 | Mariottini | G16H 50/20 706/46 |
| 2016/0267327 A1 | 9/2016 | Franz | |
| 2017/0071508 A1 | 3/2017 | Kaiser | |
| 2018/0350081 A1* | 12/2018 | Hsieh | A61B 5/1121 |

OTHER PUBLICATIONS

Xiaodong Yang et al.: "Recognizing Actions Using Depth Motion Maps-Based Histograms of Oriented Gradients", Proceedings of The 20th ACM International Conference on Multimedia, Jan. 1, 2012, p. 1057.

Liang Bin et al.: "Specivicity and Latent Correlation Learnng for Action Recognition Using Synthetic Multi-View Data From Depth Maps", IEEE Transactions on Image Processing, vol. 26, No. 12, Dec. 1, 2017, pp. 5560 to 5574.

Liang Chengwu et al: "Depth-Based Action Recognition Using Mulitscale Sub-Actions Depth Motion Maps and Local Auot-Correlation of Space-Time Gradients", 2016 IEEE 8th International Conference on Biometrics Theory, Applications and Systems (BTAS), IEEE, Sep. 6, 2016 (Sep. 6, 2016), pp. 1-7.

International Search Report, dated Feb. 1, 2019.

\* cited by examiner

DEVICE, SYSTEM AND METHOD FOR DETECTING BODY MOVEMENT OF A PATIENT

CROSS-REFERENCE TO PRIOR APPLICATIONS

This application is the U.S. National Phase application under 35 U.S.C. § 371 of International Application No. PCT/EP2018/082767, filed on Nov. 28, 2018, which claims the benefit of European Patent Application No. 17205627.7, filed on Dec. 6, 2017. These applications are hereby incorporated by reference herein.

FIELD OF THE INVENTION

The present invention is related to a device for detecting, localizing and analyzing motion of a person. The present invention further relates to a system incorporating the aforementioned device and a corresponding method.

BACKGROUND OF THE INVENTION

Automatic detection and analysis of patient movements enable continuous monitoring of patients in hospital or under homecare. Detection and analysis of body motion has a wide spectrum of applications, ranging from athletic performance analysis, surveillance in security-sensitive areas and man-machine interfaces to various clinical applications, like the determination of bed-fall risks. Further application of motion analysis is given by delirium detection. Patients with delirium, for example, exhibit distinct movement patterns with typical movements like floccillation, carphology etc. Hence, when undesirable movement from a patient is seen indicating a particular medical condition such as delirium, doctors, nurses and caregivers can be given a prompt alarm to provide immediate help.

Detection and analysis of patient movements can be done automatically with a camera by using computer vision techniques. In fact, vision based motion detection and analysis is a commonly known technique (see e.g. J. K. Aggarwal and Q. Cai: "Human Motion Analysis: A Review", Computer Vision an Image Understanding, Vol. 73, pp. 428-440, 1999). In particular, depth cameras provide a reliable method to capture and quantify movement information. This is due to the fact that depth cameras (i.e. range imaging cameras or 3D cameras) provide apart from two dimensional (2D) intensity information also depth information of a scene. A depth image provides in each pixel the distance of the camera to a seen object at framerate. With both the depth information and 2D intensity image information, accurate inference about movement can be made which is robust to changes in illumination level and camera viewpoint.

A simple movement detector system is generally implemented with methods using correlation or frame difference of two or multiple image frames obtained in a video or from a stream of images. Correlation, in this context, is represented by the (two-dimensional) correlation coefficient between two successive image frames, which is defined as the sum over the mean-subtracted pixel-wise intensity multiplications normalized by the intensity variation of pixels in each frame. High values of the negation of the correlation coefficient, e.g. of (1—correlation coefficient), are generally considered to be produced by motion. Frame difference, on the other hand, is the absolute sum of pixel-wise intensity differences in successive image frames. Again, any high value of this difference is considered to be produced by motion.

A movement detector using these methods can, per se, not give granular information like the location of movement or robust inference on occurrence of a particular movement type. When there are co-occurring body movements, e.g. both hands of a patient moving at the same time, the movement information from one particular body area cannot be separated a priori from the overall movement detection signal. If the spectrum of the movement detection signal is then to be further analyzed e.g. to detect repetitive movement, an incorrect inference may be obtained. For example, for a patient lying in bed having a finger tapping motion in his left hand while his right hand is also moving, the movement detection signal will include contributions from the movements in both hands without any assignment to location. If, however, the movement detection signal would include solely a contribution from the movement in left hand, it would be possible to infer that a repetitive movement of the left hand is occurring by spectral analysis of the corresponding movement detection signal.

So far, robust detection of movement and detailed analysis require an accurate representation of the scene in the captured image. Motion estimation algorithms, like optical flow algorithms, estimate motion at pixel-level resolution or small block-level resolution, i.e. said algorithms generate motion vectors per pixel or block in the image. However motion estimation algorithms are complex and computationally costly to run, and the final inference on motion region/type is limited by the accuracy of the used motion estimator. This is due to the fact that said algorithms are prone to noise due to their fine granularity, i.e. high resolution, in particular with respect to the kind of video recordings obtained in a clinical setting. Noisy motion estimations, however, make it very difficult to segregate co-occurring motion in different body parts. Furthermore, a detailed analysis and localization of movement requires motion estimation algorithms along with auxiliary information like body part segmentation. Although spatial segmentation of motion vectors in different clusters may be used to distinguish particularly co-occurring movements, said method is highly complex and non-trivial.

U.S. Pat. No. 9,232,912 B2 discloses a system and method for measuring the movement of one or more limbs of an infant using a video system for the purpose of determining whether the infant suffers from or is at risk of suffering from a medical condition such as cerebral palsy.

Xiaodong Yang et al.: "Recognizing Actions Using Depth Motion Maps-based Histograms of Oriented Gradients", Proceedings of the 20$^{th}$ ACM International Conference on Multimedia, 1 Jan. 2012, page 1057 discloses a method to recognize human actions from sequences of depth maps, which provide additional body shape and motion information for action recognition. In the approach, depth maps are projected onto three orthogonal planes and global activities are accumulated through entire video sequences to generate the Depth Motion Maps (DMM).

Lian Bin et al.: "Specificity and Latent Correlation Learning for Action Recognition Using Synthetic Multi-View Data From Depth Maps", IEEE Transactions on image processing, vol. 26, no. 12, 1 Dec. 2017, pages 5560 to 5574 discloses an approach to action recognition using synthetic multi-view data from depth maps. Specifically, multiple views are first generated by rotating 3D point clouds from depth maps. A pyramid multi-view depth motion template is then adopted for multi-view action representation, characterizing the multi-scale motion and shape patterns in 3D.

SUMMARY OF THE INVENTION

It is an object of the present invention to provide a device, system and method for reliably detecting body movement in a computationally cheap way and for separating body movements corresponding to different body parts.

In a first aspect of the present invention a device for detecting body movement of a patient is presented, the device comprising:

a projection sweep unit configured to obtain image data comprising depth information corresponding to an image showing the patient and to generate one or more projection images of the patient for different viewpoints, a motion detection unit configured to detect motion of the patient in the one or more projection images and to generate one or more motion detection signals indicating if motion is detected or not in a respective projection image, and an analysis unit configured to detect and localize body movements of one or more body parts of the patient based on one or more combinations of motion detection signals.

In a further aspect of the present invention a system for detecting body movement of a patient is presented, the system comprising:

a depth camera configured to acquire image data comprising depth information corresponding to an image showing the patient, and a device for detecting body movement of the patient based on the acquired image data.

In another aspect of the present invention a method for detecting body movement of a patient is presented, the method comprising the steps of:

obtaining image data comprising depth information corresponding to an image showing the patient and generating one or more projection images of the patient for different viewpoints, detecting motion of the patient in the one or more projection images and generating one or more motion detection signals indicating if motion is detected or not in a respective projection image, and detecting and localizing body movements of one or more body parts of the patient based on one or more combinations of motion detection signals.

In still a further aspect of the present invention, there is provided a computer program which comprises program code means for carrying out the steps of the method when said computer program is carried out on the computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, system, computer program and medium have similar and/or identical preferred embodiments as the claimed system, in particular as defined in the dependent claims and as disclosed herein.

The present invention is based on the idea to provide a device, system and method that allows for reliable yet simple detection and separation of co-occurring motion in a scene. Current motion detection systems are either not able to distinguish between motions occurring at different places in a scene or they may distinguish such motion but only at high expense. Instead of using elaborate motion detection algorithms, the present invention aims to detect body motion, and particularly to distinguish between simultaneously moving body parts, using a simple binary motion/no-motion detection algorithm applied to projection images.

A particular advantage with the proposed system is obtained when movement in one image part co-occurs with movement in another part or other parts. When a point cloud representing an image, i.e. a set of data points in three dimensional space, is projected for different points of view, movements in various image parts can be separated into different projection images. In particular, points related to motion in an image part may be driven into occlusion regions depending on the viewing perspective. Likewise, different parts of a scene may be suppressed or enhanced selectively in different projection images.

For an image comprising motion in a first and a second region, for example, the proposed device may generate one or more projection images solely capturing the first region of motion and one or more projection images solely capturing the second region of motion. Combining the different projection images solely capturing the first region of motion while leaving out other projections separates the motion detection signal corresponding to motion in the first region from the motion detection signal corresponding to the second region of motion. Vice versa, combining exclusively projection images solely capturing the second region of motion highlights the motion detection signal corresponding to the second region. Thus, making use of the projection sweep to generate projection images corresponding to different viewpoints, motion detection in said projection images and a combination of the detected motion detection signals allows to separate motion detection signals belonging to movement in different image regions. Accordingly, since different regions of motion belong to different body parts of the patient, movements of different body parts can be detected and analyzed separately. That is, movements of a particular body part can be accurately and independently analyzed even in the presence of co-occurring movements.

In general, the number of viewpoints directly influences the resolution or granularity with which motion is detected and localized in a scene. That applies all the more so, the more different the projection images are. The more projection images are generated and the smaller the overlapping regions of said projection images are, the finer becomes the granularity of motion detection in a scene. Therefore, a large number of small steps in projection sweep covering a wide range of viewpoints gives the flexibility to segregate even complex body movement into separate projection images. In particular, this method allows to distinguish a large number of co-occurring body movements. Advantageously, to get a meaningful movement analysis, a minimum of three at least partially different projection images is required. Further advantageously, a projection image is tied to a single predefined body part. For example, a first projection image may represent a patient's head, while a second and a third projection image may represent a patient's left and right arm, respectively. This limitation simplifies detecting co-occurring motion even more.

Apart from that, the proposed device allows inference about movement without explicit need of motion estimation and body part segmentation information.

The elements of the invention and its use are described here in the particular context of movement detection and analysis of the activity of a patient in an intensive care unit, ICU, room. Nevertheless, the system can be used in general for any similar application where movement analysis is required.

In an embodiment of the device, the motion detection unit is configured to detect the motion of the patient using a frame differencing and/or a correlation based method.

Frame differencing, also called frame subtraction, is a technique where the difference between successive image frames is checked. If pixels or voxels have changed then apparently something has changed in the image. To assign said image change to motion in the captured scene most techniques work with some blur or threshold to filter changes caused by noise or changes in illumination. Frame difference, in particular, is defined as the absolute sum of pixel-wise intensity differences in successive image frames. A non-zero value, particularly a high value, of this difference is considered to be produced by motion.

Correlation based methods, on the other hand, make use of the 2D or 3D correlation coefficient, in particular Pearson's correlation coefficient, of consecutive image frames. This coefficient is defined as the sum over the mean-subtracted pixel-wise intensity multiplications normalized by the intensity variation of pixels or voxels in each frame. Again, high values of the negation of the correlation coefficient, e.g. of (1—correlation coefficient), are considered to be produced by motion. Based upon a predefined threshold for the correlation coefficient and/or the frame difference value the motion detection unit may thus indicate if motion is detected or not in an image. Both the frame differencing and the correlation based method are simple and thus computationally cheap.

In fact, both methods need only be applied to a projection image as long as no difference is found between the images to be compared with each other. As soon as a difference is found in successive corresponding pixels or voxels, image comparison may stop since the motion detection unit only needs to detect if, or if not, motion is present in an image, and not to localize said motion.

In another embodiment of the device, the analysis unit is configured to detect body movements using auxiliary information comprising any one of bed position and/or orientation, camera location and detected extreme points corresponding to body extremities. With bed position and orientation information, for example, each projection image can be linked a priori to a particular side of the bed and/or patient, respectively. This prior information can be used by the analysis unit. For example, in an image with the bed being across the width in the image plane, a projection sweep from left to right corresponds to projection images in parallel to the patient's sagittal plane. If, however, the bed would be across the length in the image plane, then the same projection sweep would correspond to a projection from head to toe. While the former projection images may be used to detect and distinguish sagittal motions of a patient, the latter images may be used to separate motions along the longitudinal body axis corresponding to head and toes, for example. The auxiliary information may be provided via a user interface by clinical personnel or the device itself may acquire said information itself using an automated computer-vision unit, for example.

In a further embodiment of the device, the analysis unit is configured to infer movement data comprising any one of region of motion, direction of motion, speed of motion and frequency of motion and motion patterns. Hence, the analysis unit may infer which body parts of a patient are moving and how movement takes place. For example, the analysis unit may infer that a patient moves fast towards the edge of his bed or scratches a certain part of his body. By inferring the direction and speed of motion the analysis unit may further analyze the type of movement, for example, whether said movement is smooth or jerky. In particular, periodic motion and its frequency may be recognized such as trembling or the movement of extremities in periodic limb moving disorder, for example.

In yet another embodiment of the device, the analysis unit is configured to assign the detected body movements to a medical condition based on a mapping between the detected body movements and the medical condition. This allows the system to derive a patient's medical condition from the detected motion detection signals. Lint-picking behavior, for example, may be associated by the analysis unit with a delirious state. Likewise, twitching may be associated with an epileptic seizure.

In another embodiment of the device, the analysis unit comprises one or more machine learning models trained and/or configured to be trained for a predefined functionality. While simpler functionalities include ascertaining where motion occurs in an image, more complex functions include ascertainment of periodic motions in a particular image region by keeping track of the detected motion in said region. For example, a first model may be trained to infer the speed of said motion, a second model may be trained to infer the direction of said motion and a third model may be trained to assign the parameters measured to a corresponding medical condition. In a more complex setting, a machine learning model is trained to take different motion detection signals and to produce an output on multiple predefined decisions concerning body part movement. For example, the machine learning model may infer whether a patient's head is moving or his left or right hand are moving, for example. In order to infer said information the one or more machine learning models can use auxiliary information. Typical movements, e.g. floccillation in delirium, may be identified based upon a training set for these one or more models where movement characteristics may be annotated.

In an embodiment of the device, the analysis unit is configured to combine the motion detection signals according to a weighting factor. One possible weighting factor is the strength of the detected motion signal, which is given by the magnitude of the frame difference or the magnitude of the correlation coefficient, for example. Other exemplary weighting factors comprise image sharpness, lightening conditions and other image quality factors or other markers referring to motion detection signal strength.

According to another embodiment of the device, the projection sweep unit is configured to obtain images from different angles and/or different zoom levels. This additional information may be used to generate further projection images and thus helps achieve finer granularity. A projection at different zoom levels, for example, helps focus on a moving region to get more detailed information about co-occurring body parts there. This is particularly relevant for the analysis of small body parts moving such as fingers, for example.

In yet another embodiment, the device further comprises a user interface configured to present the analysis provided by the analysis unit, to obtain the auxiliary information and/or to obtain the mapping between the detected body movements and the medical condition, and/or the device further comprises a storage unit configured to store any one of the image, the one or more projection images, the movement data, the auxiliary information and the mapping between the detected body movements and the medical condition.

For example, the user interface may comprise a display showing region, speed and direction of each motion detected. Furthermore, motion patterns and deduced medical conditions may be indicated. The user interface may also be used by clinical personnel, for example, to provide the device with auxiliary information concerning bed position and orientation which may then be related by the analysis unit to particular image regions. Moreover, the user interface may be used to provide the device with information concerning the relation between body movements and medical conditions. In particular, the user input such as the mapping between a detected body movements and a medical condition may be used for training the one or more machine learning models of the analysis unit.

The storage unit, on the other hand, may store such a mapping, for example, in the form of a table, wherein the analysis unit has access to said table. Storing movement data and corresponding images is particularly helpful for treating patients with recurrent illness. Movement patterns of previous hospital stays may be compared to current moving behavior to draw conclusions on the progress of a disease.

In another embodiment, the projection sweep unit of the device is configured to generate one or more sub-images of the image and/or of the one or more projection images and the motion detection unit is configured to detect a sub-image motion detection signal from the one or more sub-images indicating if motion is detected or not in a respective sub-image. Sub-images may be generated by zooming in and/or by cutting an image and/or a projection image. Sub-images and detecting motion in said images is particularly used to narrow down the region of a motion detection signal, i.e. to localize motion in a scene more precisely. Sub-images are of particular relevance for regions where motion cannot be located unambiguously by combination of image and projection images, respectively.

In still another embodiment, the projection sweep unit is configured to generate one or more projection sub-images from the one or more sub-images for different viewpoints and the motion detection unit is configured to detect a further motion detection signal from the one or more projection sub-images indicating if motion is detected or not in a respective projection sub-image.

In yet another embodiment of the device, the projection sweep unit is configured to generate any one of projection images, sub-images and projection sub-images with or without depth information.

Hence, after obtaining image data comprising depth information the projection sweep unit may project the input image onto different planes corresponding to different viewpoints either retaining distance information, i.e. in fact creating 3D images, or leaving out said information. Since motion detection in simple two-dimensional images generally involves less effort than motion detection in three-dimensional images, motion detection may become more effective when leaving out depth information. The kind of mapping of a three-dimensional image, i.e. a two-dimensional image further comprising depth information, onto a two-dimensional plane to may be any one of orthographic projection, weak perspective projection and perspective projection. Still, there may be cases where omitting depth information is not economical, for example in cases where only few projection images need to be analyzed.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE EMBODIMENTS

Figure 1:
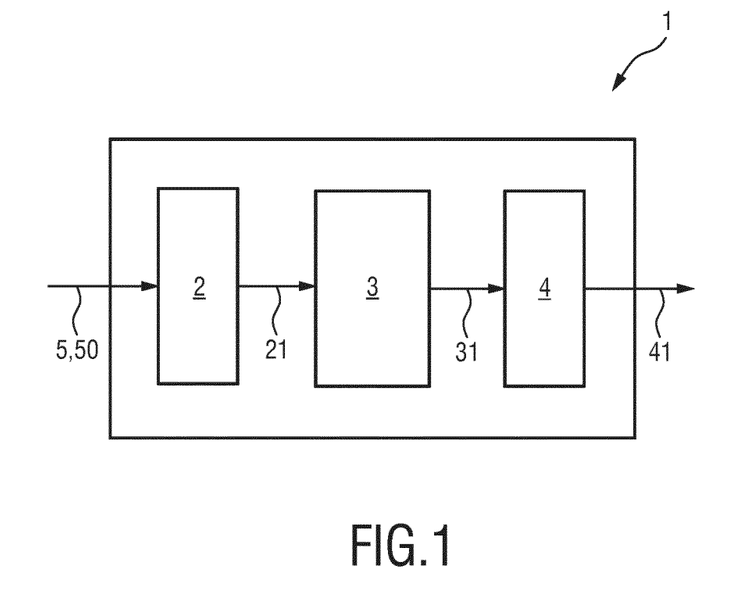
FIG. 1 shows a schematic diagram of an embodiment of the device for detecting body movement of a patient according to the present invention.

FIG. 1 shows a schematic diagram of an embodiment of the device 1 for detecting body movement of a patient according to the present invention. The device 1 comprises a projection sweep unit 2, a motion detection unit 3 and an analysis unit 4.

Using image data comprising depth information 5 the projection sweep unit 2 projects a corresponding image 50 for different viewpoints as if the camera was panned and/or localized elsewhere in the room. Consequently, one or more projection images 21 are obtained. For each of these projection images 21, i.e. the corresponding projection image data, the motion detection unit 3 is configured to detect as a binary decision if motion is present in a respective projection image 21 or not. The motion detection signals 31 thus obtained for the projection images 21 are passed on to the analysis unit 3. In the analysis unit the signals 31 may be combined in any way to detect body movements in the scene in more detail, in particular to localize and analyze said movements. The result of the analysis 41 may then be used for further processing.

Figure 2:
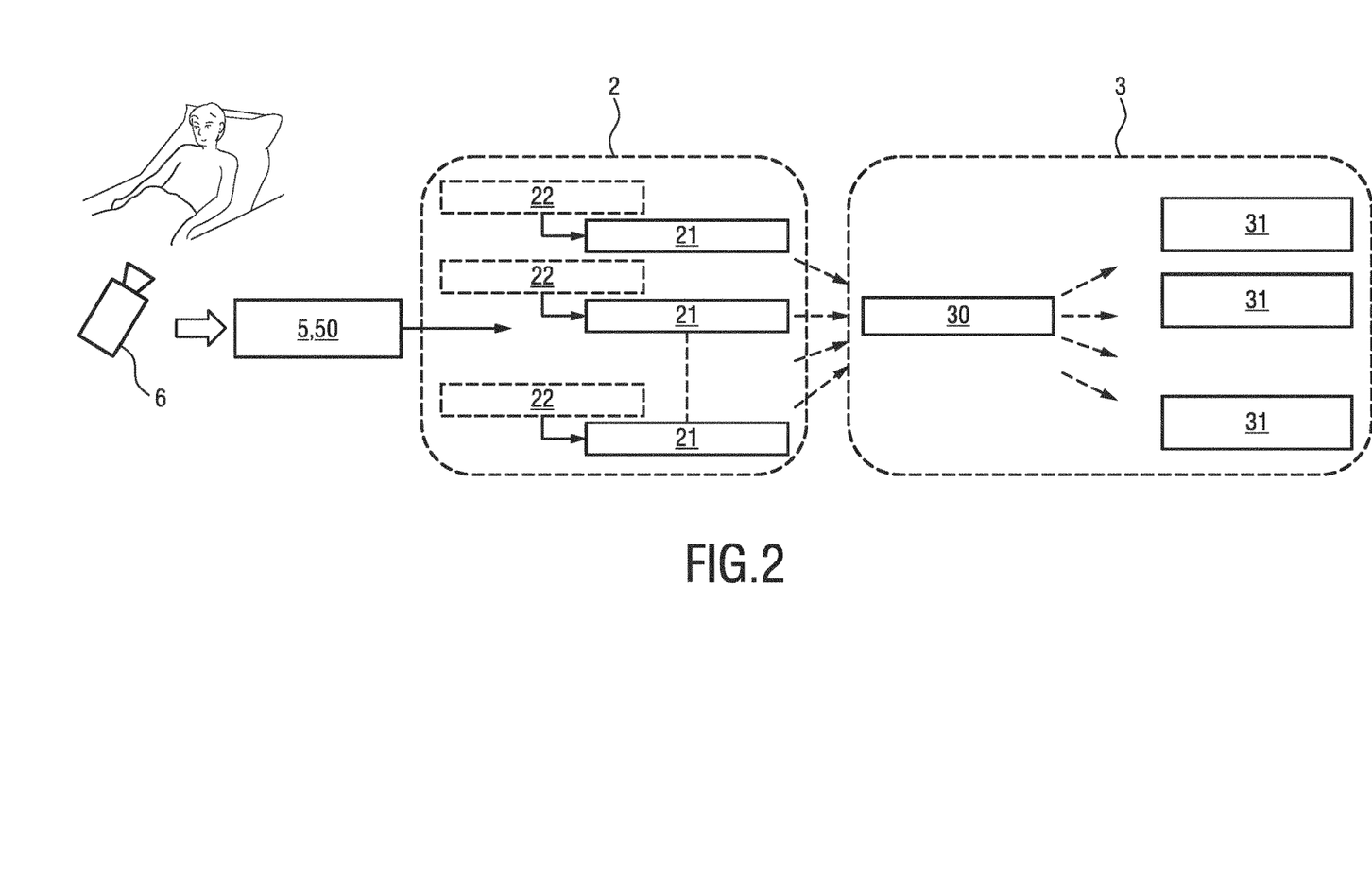
FIG. 2 shows a flow chart of an embodiment of a method for detecting body movement of a patient according to the present invention.

FIG. 2 shows a flow chart of an embodiment of a method for detecting body movement of a patient according to the present invention.

In a first step, image data comprising depth information 5 are received from a depth camera 6. Said image data may correspond to an image showing a subject in bed, for example. Given said data 5, if it is found by a motion detector 30 of motion detection unit 3 that motion occurs in the image, an image stream of different projection images 21 corresponding to different viewpoints 22 is generated by the projection sweep unit 2. The different projection planes or viewpoints 22 are generated based upon a discrete sweep starting from an initial camera plane. In an alternate scenario where no explicit information about the initial camera plane is available, projection planes are chosen based upon static information in the monitored scene, i.e. auxiliary information, like the orientation of floor and wall. It is also possible to make a full sweep over the entire range of a viewpoint 22. In a next step, the generated projection images 21 are provided to the motion detection unit 3 comprising the motion detector 30, which determines motion, if any, in each of the projection images 21. A simple motion detection algorithm based upon correlation or frame difference of successive images is used to make a decision regarding motion/no-motion, i.e. motion or no motion, in these image streams. Thus the motion detection is computationally cheap. The resulting motion detection signals 31 are then combined and analyzed in the analysis unit 4. Despite the motion detection signals 31 being binary motion/no-motion signals, i.e. binary signals indicating per projection if, or if not, motion is present in a respective projection image, the analysis unit 4 is able to combine the motion detection decision from different projection image streams to get more complex reasoning about the movement. Apart from localizing movement in the image, the analysis unit 4 may assign the detected motion to specific body parts, infer frequency of motion and recognize repetitions, for example. Detection, localization and analysis of motion in the scene may take place regularly or in intervals.

Figure 3A:
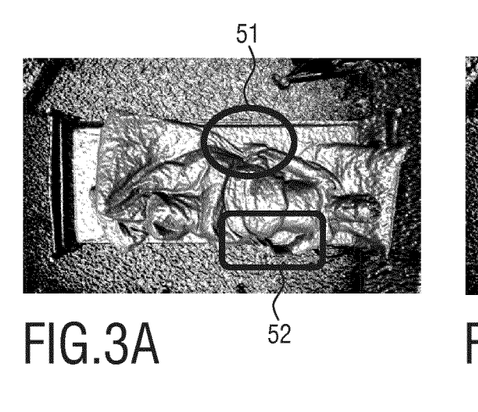
FIGS. 3A to 3F show an image of a patient and corresponding projections of said image for two successive points in time according to the present invention.
Figure 3B:
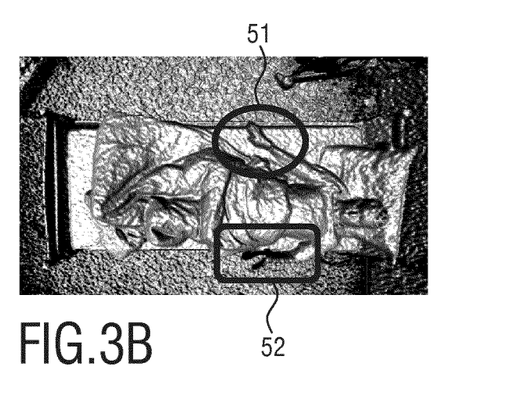
Figure 3C:
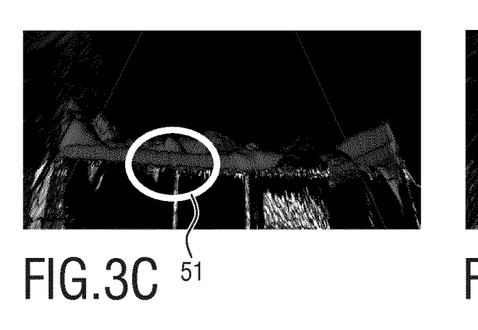
Figure 3D:
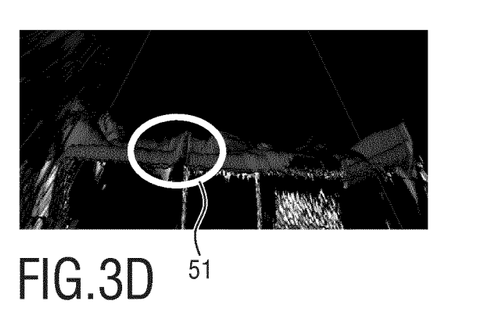
Figure 3E:
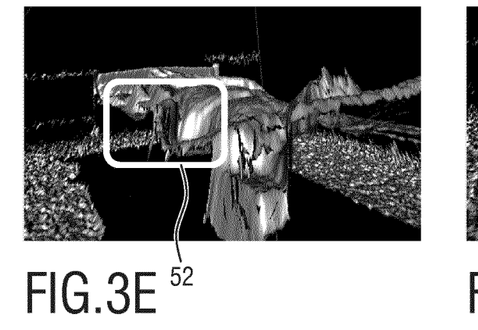
Figure 3F:
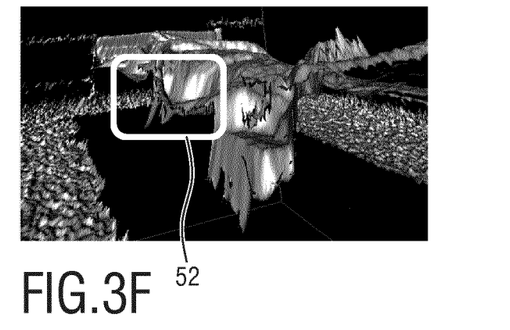

FIGS. 3A to 3F show an image 50 of a patient and corresponding projections 21 of said image 50 for two successive points in time according to the present invention. In particular, FIGS. 3A and 3B show a patient lying in a bed in a top view, FIGS. 3C and 3D show the same patient in a side view, whereas FIGS. 3E and 3F show said scene from an angle behind the patient's head. FIGS. 3A, 3C and 3E each show the scene at the same point in time. The same applies to FIGS. 3B, 3D and 3F being all captured at a later point in time. The input scene, shown in FIGS. 3A and 3B, respectively, comprises movements in both the right and the left hand of the patient as marked by the areas 51 and 52, respectively. As can be seen from FIGS. 3C and 3D the projection image for the side view captures only area 51 of the two areas. Hence, the movement of the patient's right hand is viewed, whereas the movement of the left hand corresponding to area 52 is occluded in this perspective. In FIGS. 3E and 3F, on the other hand, the movement of the left hand, i.e. area 52, can be seen clearly, whereas area 51 comprising the right hand is occluded. Hence, by the projections shown in FIGS. 3C and 3D and in FIGS. 3E and 3F, respectively, co-occurring movements in the patient's hands are visualized separately.

Figure 4A:
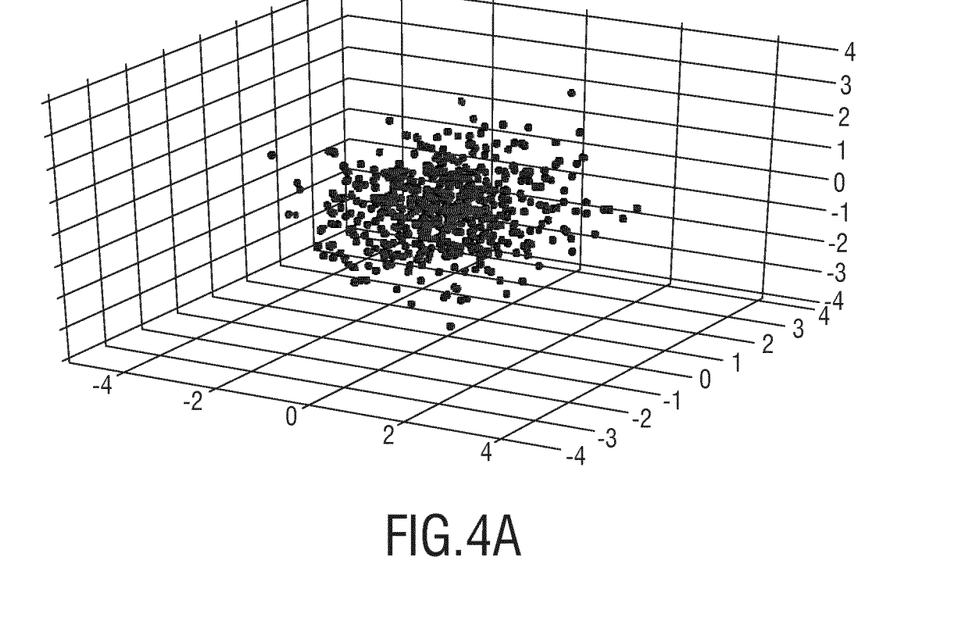
FIGS. 4A and 4B show two different projection images of an image as generated by an embodiment of a device according to the present invention.
Figure 4B:
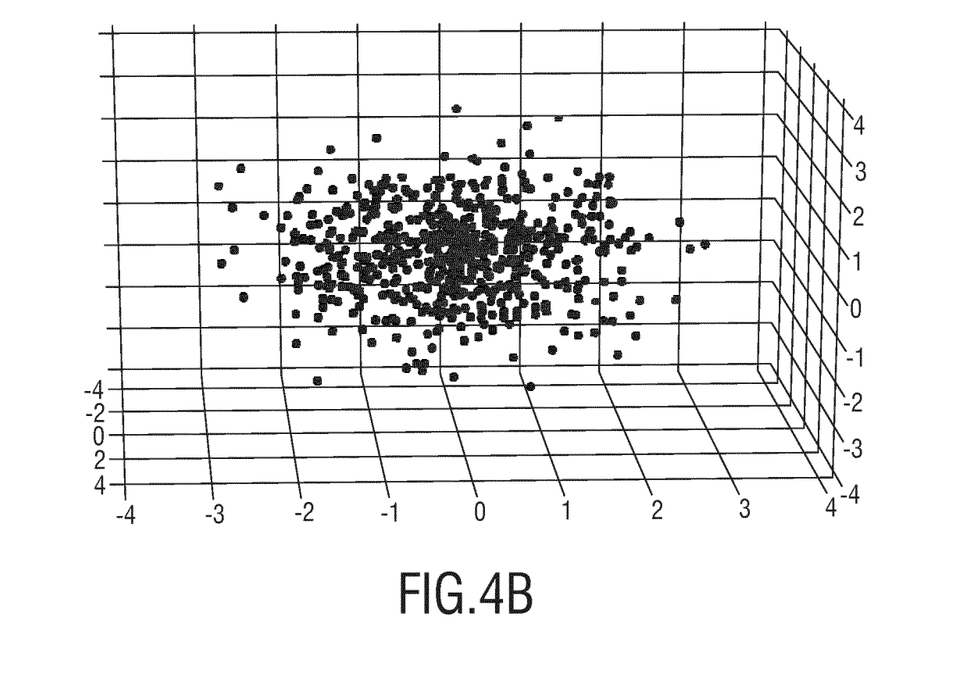

FIGS. 4A and 4B show two different projection images 21 of an image 50 as generated by an embodiment of a device 1 according to the present invention. In particular, FIGS. 4A and 4B show a collection of points forming a three-dimensional representation of a scene, i.e. a point cloud. Each point of the projections is identified by its three coordinates x, y and z. A viewpoint is uniquely identified by a plane and correspondingly by the normal to the plane. Images corresponding to image data comprising depth information can be projected onto another plane in order to obtain another projection image comprising depth information for another viewpoint. FIG. 4A, for example, shows an image comprising depth information, i.e. a three-dimensional point cloud $P_c$, as seen from a viewpoint corresponding to a plane defined by a normal $N_c$. The normal of the plane of viewpoint where the points are to be projected be $N_p$. The angle between these normals defines a rotation matrix R and the point cloud $P_c$ when viewed from the viewpoint corresponding to normal $N_p$ is given by $P_c'=R*P_c$. The set of points visible from the viewpoint defined by $N_p$, i.e. the image comprising depth information $P_c'$, is shown in FIG. 4B. Due to the different viewpoints some of the points visible in cloud $P_c$ are hidden in $P_c'$. In particular, points and (their) surfaces close to the viewpoint plane will block points (and their surfaces) in the same viewpoint line but further away from the respective projection planes. Although FIG. 4B may already be used as three-dimensional projection image, i.e. as projection image comprising depth information, in the motion detection unit 3, the projection sweep unit 2 preferably further processes said image to gather a two-dimensional projection, i.e. a projection image without depth information, of the retained set of points in $P_c'$. In fact, detecting motion signals in a two-dimensional image instead of a three-dimensional image reduces computational efforts tremendously. Projection methods used may either be orthographic or perspective projections. Since orthographic projections ignore that objects in the distance appear smaller than objects close by, perspective projections are preferred. Using this method, the final 2D image is obtained as $X'=f*x'/z'$, $Y'=f*y'/z'$, wherein the coordinate x', y' and z' correspond to points in the image data comprising depth information $P_c'$, f is an arbitrary scaling factor, and the coordinates X' and Y' represent the 2D projection in the viewpoint plane defined by the normal $N_p$. The collection of all the points X' and Y' corresponding to x', y' and z' of points in $P_c'$ is defined as the projection image. It is possible to further define a translation vector T to simulate the viewpoint plane getting closer to or away from the point cloud or projected point cloud. Using such a zooming may lead to separation of different movements as well.

Figure 5:
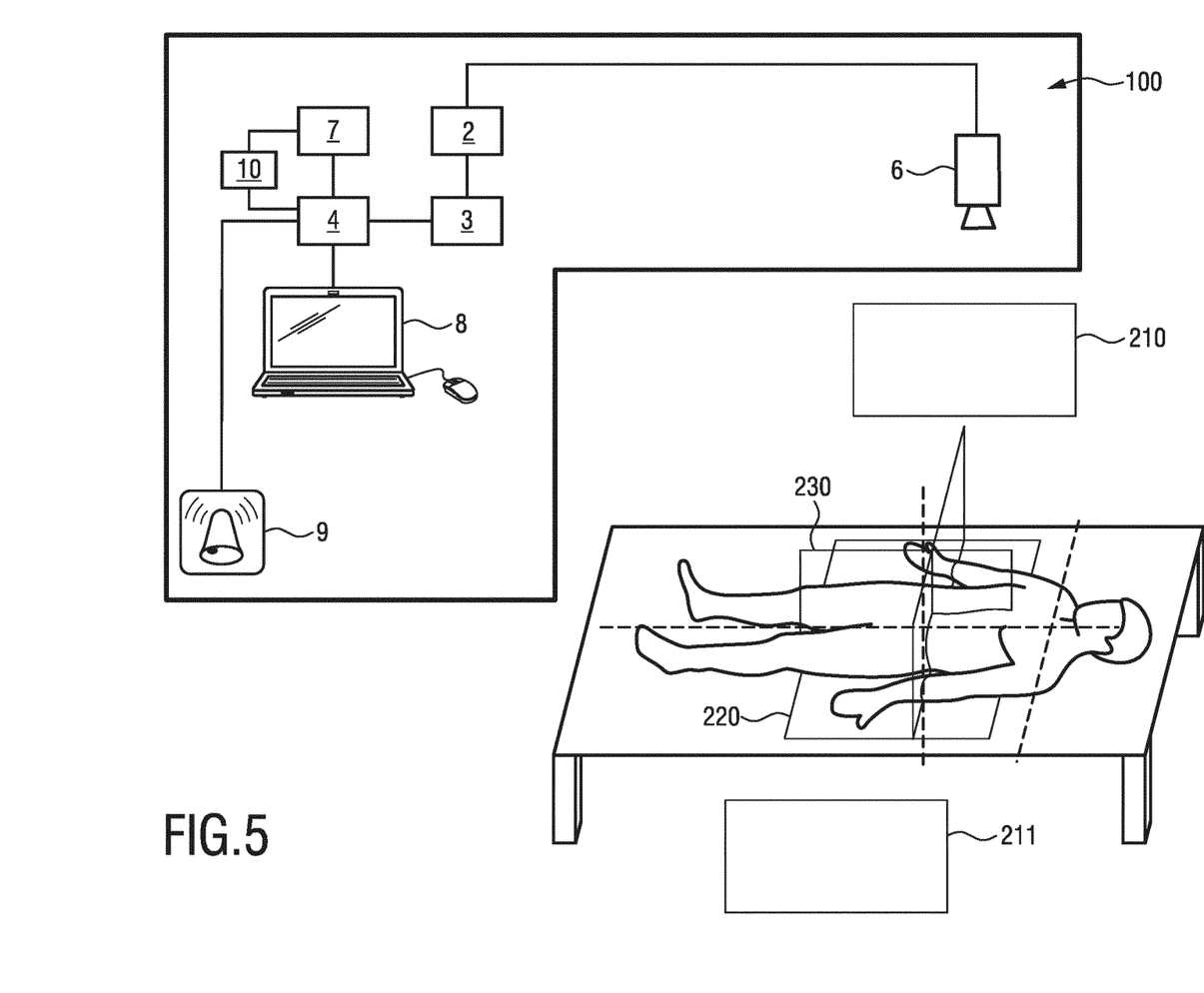
FIG. 5 shows a schematic diagram of an embodiment of the system for detecting body movement of a patient according to the present invention.

FIG. 5 shows a schematic diagram of an embodiment of the system 100 for detecting body movement of a patient according to the present invention. The system 100 comprises a depth camera 6, a projection sweep unit 2, a motion detection unit 3, an analysis unit 4, a storage unit 7, a user interface 8, an alarming unit 9 and an automated computer-vision unit 10.

In this scenario the camera 6 is located directly above the patient bed viewing the patient from a parallel to his frontal plane 220, i.e. from a parallel to the bed's upper surface. The collected image data 5 are then provided to the projection sweep unit 2. In this embodiment the projection sweep unit 2 projects the image 50 obtained corresponding to image data comprising depth information 5 onto two projection planes 210 and 211, which are both located parallel to the sagittal plane 230 of the patient's body, in particular to the left and right side. Thus, the projection images generated in this embodiment are two-dimensional images missing depth information.

To detect and analyze movement of the patient's right hand only, the motion detection is applied to images projected onto plane 210 and/or other planes close to plane 210. The planes (or the vicinity region) to be selected here is identified based upon the information of the bed orientation and camera orientation. This auxiliary information about bed and camera orientation is either available by system initialization, provided by the user via the user interface 8 or derived from static regions of the scene observed by the automated computer-vision unit 10. In selecting the plane 210 and other planes in its vicinity to detect movement in the right hand, the system 100 implicitly locates the movement region. The proposed system 100 can also explicitly detect the location of the movement.

Movements of the patient's left hand, for example, are only captured in the projection image corresponding to plane 211. The points of the left hand are occluded, however, when the image 50 comprising depth information is projected onto plane 210. Similarly, the right hand is captured in the projection image corresponding to plane 211 only. Therefore, motion information for movements in different body parts is separated. Still, in case both hands are moving, the combined motion detection signals from plane 210 and plane 211 capture the information that both the left hand and right hand are moving.

In the analysis unit 4 the separate motion information signals coming from planes 210 and 211, respectively, are analyzed further, e.g. by spectral analysis, to make inferences on periodicity, duration etc. Also motion patterns in the motion detection signals may be found by the analysis unit 4.

The gained information concerning the patient's movement, e.g. the location, speed and duration of said movement, can then be compared to movement data stored in the storage unit 7. Movement data, in particular, comprise motion characteristics of particular disorders and motion patterns. Additionally, the storage unit 7 may store said data with a mapping to data concerning associated medical conditions.

Hence, when the analysis unit 4 finds that a patient suffers from a disorder by comparing the detected motion detection signals 31 with motion data from the storage unit 7 the diagnosis may be displayed on a display of the user interface 8. The display of the user interface 8 may be a bedside patient monitor, a nurse monitor and/or a doctor monitor.

Likewise, depending on the diagnosed medical condition an audible, visual or tactile alarm can be given to medical staff by the alarming unit 9. For this purpose, the analysis unit 4 may assign a risk score to each diagnosed medical condition and may give a signal to the alarming unit 9 to alert medical staff when a predefined risk score threshold is exceeded.

Apart from a real-time analysis the analysis unit 4 is configured to provide a long-term analysis of the patient's motoric behavior. By analyzing the motion detection signals 31 over a predetermined time interval the analysis unit 4 may further infer information about a patient's mean activity and changes and/or trends of the patient's activity. The mean duration of delirium, for example, may be several hours, e.g. in a practical exemplary situation about 48 hours. Thus, the reliability of diagnosing delirium can be increased if a delirious patient is monitored over a corresponding time span. Still, detecting body movements need not take place continuously, but may be performed at particular points in time, for example at sleeping time.

The storage unit 7 may further be configured to store the motion detection signals as well as the corresponding analysis 41 of the analysis unit 4 for a predetermined time interval.

Figure 6:
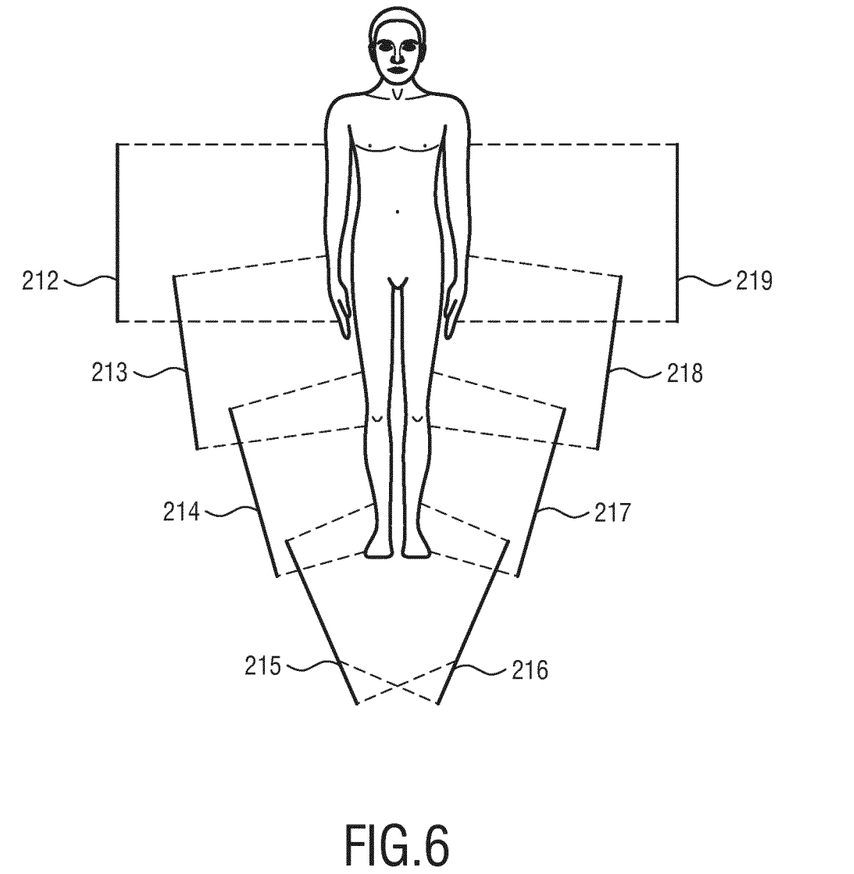
FIG. 6 shows eight different projection planes used to detect, analyze and localize motion of a patient lying in a bed.

FIG. 6 shows eight different projection planes used to detect, analyze and localize motion of a patient lying in a bed. In an original image the bed of the patient is viewed from above. A subsequent detailed localization of movement is made based upon motion detection decisions tied to eight different projections of said original image onto planes 212 to 219. In case the motion detection decisions from planes 212 to 219 be "y", "y", "n", "n", "n", "y", "y", "n", wherein "y" implies the detection of motion and "n" implies no detection, motion is detected for viewpoints corresponding to planes 212, 213, 217 and 218. Due to the position of said viewpoints, i.e. projection planes, with respect to the position of the patient, which has been determined in advance, it can be inferred that there are two possible regions of motion—the first being the intersection region of viewpoints corresponding to plane 212 and plane 213, the second being the intersection region of viewpoints for planes 212 and 219. To gather further information about motion in said regions, the projection sweep unit 2 may generate sub-images of these regions from the original image and further projections of said sub-images.

Figure 7:
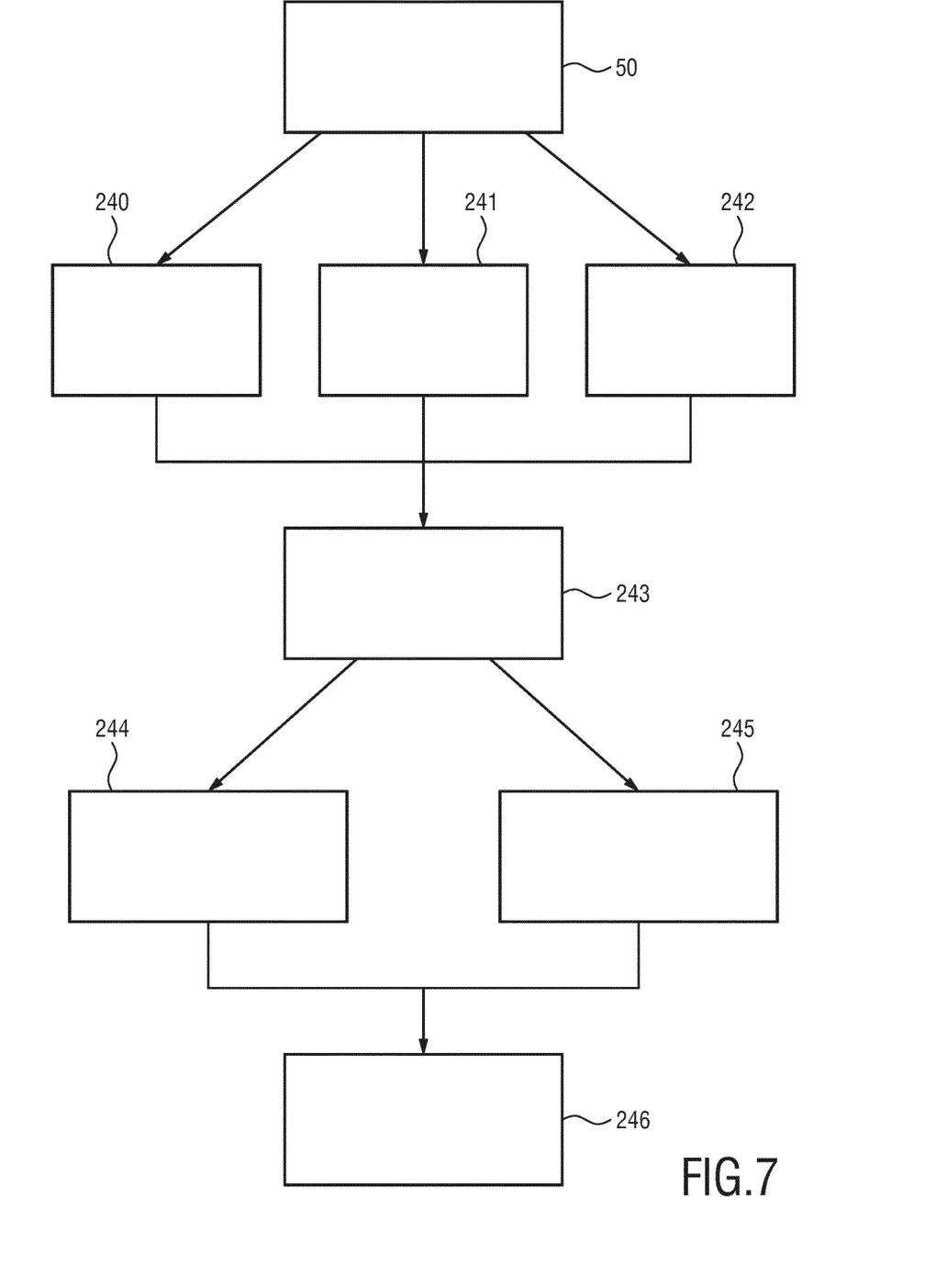
FIG. 7 shows a flow chart of images generated by an embodiment of a device according to the present invention.

FIG. 7 shows a flow chart of images generated by an embodiment of a device according to the present invention. The several projection images 240 to 246 are generated to detect, localize and analyze finger movement of a patient.

Using a sequence of projection images a more precise localization of the movement region is exploited for reliable movement detection and inference of movement type. Upon receiving a patient image 50 corresponding to image data 5 comprising depth information, the projection sweep unit 2 creates projection images 240, 241 and 242 each showing the patient from a different perspective. While image 240 shows the patient's head and left arm, image 241 shows the patient's torso and left arm and image 242 shows the patient's left arm and legs. In case motion is detected in each of these projected images, the analysis unit locates the detected motion in the overlapping region of the projections, i.e. the region comprising the patient's arm. Subsequently, the analysis unit 4 zooms into the region of movement so that information from this region is captured in greater detail. This results in image 243 solely showing the left arm as viewed from the perspective corresponding to image 50. Depending on the quality of image data 5 a zoomed-in image 243 may also be obtained from an external depth camera, for example. Based upon the detected region of movement further projection sweeps are applied showing the patient's arm from a plane parallel to the patient's sagittal plane in image 244 and from a plane parallel to the transversal plane in the inferior of the patient as shown in image 245. This provides the benefit of getting finer information, e.g. by doing a finer projection sweep in the constrained region where the movement has been detected in the previous step. If movement is only detected in projected image 245 the motion detected must have occurred in a region occluded in image 244, presumably one of the patient's fingers in the vicinity of the torso. The fingers may then be monitored further and movement can be analyzed in zoomed-in image 246 in the analysis unit 4. The identification of fingers moving is supported by spectral analysis and the use of auxiliary information like location of body extremities in the image. Said auxiliary information may be provided to the analysis unit 4 and used to tie the projection planes to respective body regions. If the analysis unit 4 determines that the fingers moving resemble lint-picking behavior associated to delirium doctors and caregivers may be alarmed immediately.

In summary, the proposed system allows for the detection of movement in a scene part and makes inference about the movement type using a simple motion detection algorithm without the explicit need of motion estimation and body part segmentation information. When there are co-occurring movements, the proposed system is able to separate and analyze movements in different body parts independently.

The proposed system can be used for applications like monitoring of a patient with a camera. It could be used in a single patient monitoring setting like in an ICU or even in a general ward with multiple patients in the camera's view. Besides the overall actigraphy based upon the movement of the whole body, clinical applications like delirium detection systems will benefit from finer information like the number of detected movement events in specific body regions like hands and legs, the number of floccillation movements detected etc.

Outside of the clinical application scenario, the proposed system can be used for motion localization and enhancement in applications where fine grained movement information is helpful. Some example applications are unusual behavior detection in crowd, user gesture recognition, fall prediction, gait analysis etc.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for detecting body movement of a patient, the device comprising:
a projection sweep unit configured to obtain image data comprising depth information corresponding to an image showing the patient and to generate one or more projection images of the patient for different viewpoints,
a motion detection unit configured to detect motion of the patient in the one or more projection images and to generate one or more motion detection signals indicating if motion is detected or not in a respective projection image, and
an analysis unit configured to detect, localize, and separate co-occurring body movements of two or more body parts of the patient based on one or more combinations of the motion detection signals.

2. The device according to claim 1,
wherein the motion detection unit is configured to detect the motion of the patient using a frame differencing and/or a correlation based method.

3. The device according to claim 1,
wherein the analysis unit is configured to detect body movements using auxiliary information comprising any one of bed position and/or orientation, camera location and detected extreme points corresponding to body extremities.

4. The device according to claim 1,
wherein the analysis unit is configured to infer movement data comprising any one of region of motion, direction of motion, speed of motion and frequency of motion and motion patterns.

5. The device according to claim 1,
wherein the analysis unit is configured to assign the detected body movements to a medical condition based on a mapping between the detected body movements and the medical condition.

6. The device according to claim 1,
wherein the analysis unit comprises one or more machine learning models trained and/or configured to be trained for a predefined functionality.

7. The device according to claim 1,
wherein the analysis unit is configured to combine the motion detection signals according to a weighting factor.

8. The device according to claim 1,
wherein the projection sweep unit is configured to obtain images from different angles and/or different zoom levels.

9. The device according to claim 1,
further comprising a storage unit configured to store any one of the image data, the one or more projection images, the movement data, the auxiliary information and the mapping between the detected body movements and the medical condition, and/or
further comprising a user interface configured to present the analysis provided by the analysis unit to obtain the auxiliary information and/or to obtain the mapping between the detected body movements and the medical condition.

10. The device according to claim 1,
wherein the projection sweep unit is configured to generate one or more sub-images of the image and/or of the one or more projection images and wherein the motion detection unit is configured to detect a sub-image motion detection signal from the one or more sub-images indicating if motion is detected or not in a respective sub-image.

11. The device according to claim 1,
wherein the projection sweep unit is configured to generate any one of projection images, sub-images and projection sub-images with or without depth information.

12. A system for detecting body movement of a patient, the system comprising:
a depth camera configured to acquire image data comprising depth information corresponding to an image showing the patient, and
a device as claimed in claim 1 for detecting body movement of the patient based on the acquired image data.

13. A device for detecting body movement of a patient, the device comprising:
a projection sweep unit configured to obtain image data comprising depth information corresponding to an image showing the patient and to generate one or more projection images of the patient for different viewpoints,
a motion detection unit configured to detect motion of the patient in the one or more projection images and to generate one or more motion detection signals indicating if motion is detected or not in a respective projection image, and
an analysis unit configured to detect and localize body movements of one or more body parts of the patient based on one or more combinations of the motion detection signals,
wherein the projection sweep unit is configured to generate one or more sub-images of the image or of the one or more projection images and wherein the motion detection unit is configured to detect a sub-image motion detection signal from the one or more sub-images indicating if motion is detected or not in a respective sub-image,
wherein the projection sweep unit is configured to generate one or more projection sub-images from the one or more sub-images for different viewpoints and wherein the motion detection unit is configured to detect a further motion detection signal from the one or more projection sub-images indicating if motion is detected or not in a respective projection sub-image.

14. A method for detecting body movement of a patient, the method comprising the steps of:

obtaining image data comprising depth information corresponding to an image showing the patient and generating one or more projection images of the patient for different viewpoints, detecting motion of the patient in the one or more projection images and generating one or more motion detection signals indicating if motion is detected or not in a respective projection image, and detecting, localizing, and separating co-occurring body movements of two or more body parts of the patient based on one or more combinations of the motion detection signals.

15. A non-transitory computer readable medium storing instructions executable by an electronic data processing device, the non-transitory computer readable medium comprising instructions that, when executed, cause the electronic data processing device to:

obtain image data comprising depth information corresponding to an image showing a patient and generate one or more projection images of the patient for different viewpoints, detect motion of the patient in the one or more projection images and generate one or more motion detection signals indicating if motion is detected or not in a respective projection image, and detect, and localize, and separate co-occurring body movements of two or more body parts of the patient based on one or more combinations of the motion detection signals.

* * * * *